March 18, 1941.  A. F. HERLIHY  2,235,801
EDUCATIONAL DEVICE
Filed March 15, 1940
Fig. 1
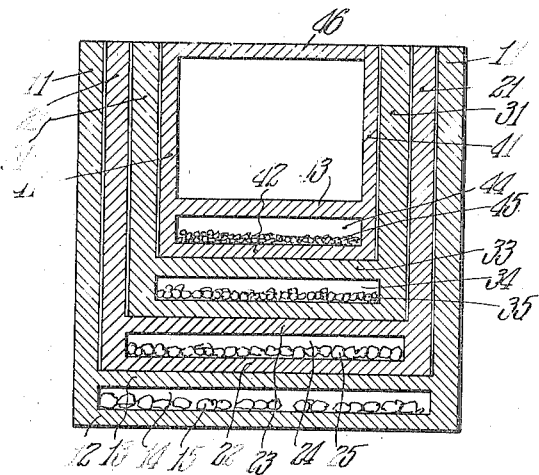
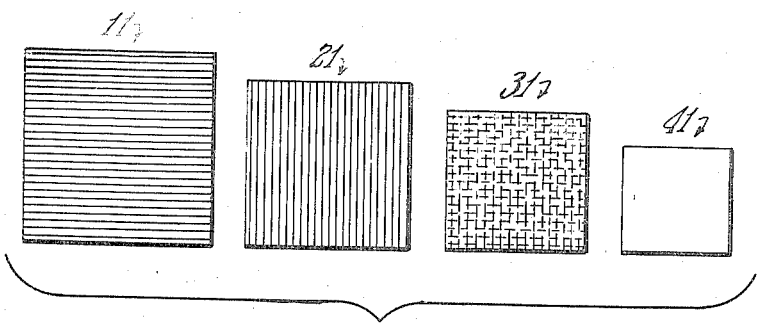
Fig. 2
INVENTOR.
Anne Farrell Herlihy.
BY Walter C. Ross Patented Mar. 18, 1941

2,235,801

UNITED STATES PATENT OFFICE 2,235,801

EDUCATIONAL DEVICE

Anne Farrell Herlihy, New York, N. Y.

Application March 16, 1940, Serial No. 324,360

2 Claims. (Cl. 35—1)

My invention relates to an educational device which may be used for various educational purposes, and the principal object thereof is directed to the provision of a unique and novel arrangement of parts which serves as an educational instrument for a child, whereby a child may learn to correlate colors and sizes and sounds and weights, all to the end that a child develops an ability to distinguish between light and dark, between large and small, between soft and loud and between light and heavy.

By means of my device, a child is taught not only to recognize these factors when he meets them singly, but also to associate them when he meets them jointly, as will be hereinafter more fully explained.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Fig. 1 is a cross-sectional view of the device of my invention in assembled relation; and Figs. 2a, 2b, 2c and 2d are sectional views of the device of my invention as shown in Fig. 1, in disassembled relation as to each other.

Referring now to the drawing more in detail, wherein similar reference figures refer to like parts, and referring more particularly to the preferred form of my invention which has been selected for illustrative purposes, I have shown a receptacle having side walls 11 and a bottom wall 12 with an intermediate wall 13 spaced away from the bottom wall, substantially as shown, so as to provide therebetween a sealed compartment 14 into which may be disposed weight means 15.

The receptacle is preferably made of wood for the reasons that it is more economical to manufacture and that it is a material which children seem to prefer to handle, although it is of course to be understood that it may be made of other materials equally as well so as to achieve the same results.

The weight means 15 may consist of a plurality of objects such as pebbles, beans, bird shot, or the like, whereby the addition thereof to the sealed compartment 14 causes the receptacle to weigh more or less as may be desired and for reasons as will hereinafter more fully appear.

Nested within this outermost receptacle, I provide another receptacle of similar construction. This receptacle is preferably square in its shape and is slightly smaller in its size so as to be receivable within the outermost receptacle. The receptacle consists of side walls 21 and bottom wall 22 and an intermediate wall 23 which is spaced away from the bottom wall 22 to provide a sealed compartment 24 into which weight means 25 may be disposed.

Nested within this last described receptacle, I provide still another similar but, of course, smaller receptacle having side walls 31, bottom wall 32 and an intermediate wall 33 whereby a compartment 34 containing weight means 35 is provided.

A still smaller receptacle, and in the form disclosed herein, the smallest receptacle nests within the third mentioned receptacle and consists of side walls 41, a bottom wall 42, and an intermediate wall 43 whereby a compartment 44 containing a weight means 45 is provided.

This smallest receptable preferably distinguishes from all of the other receptacles by virtue of its having a top wall member 46, all to the end that when the receptacles are in nested relation, as shown in Fig. 1, what appears to be one large block is thus provided.

Various changes and modifications may be made in my invention from the form just described without departing from the spirit and scope thereof. The above embodiments are therefore to be considered in all respects as being merely illustrative and not as being restrictive, and all changes which come within the meaning and range of equivalency thereof are therefore intended to be embraced within the scope of my invention.

For instance, it is not necessary that the blocks be "nesting blocks" in order to accomplish the intended purpose hereinafter to be more fully explained. All of the blocks may be provided with top or cover members, just as is the smallest block shown in Fig. 1 provided with a cover member 46, so as to accomplish the identical results, or if it is desired, cylinders, which may or may not nest within each other, may be used instead of blocks.

The various component parts of my invention having been described, I shall now attempt to describe my invention more in detail. In the first place, as shown the blocks are all rectangular or square in their shape but are of different sizes. A youngster of one, two, or three years of age first learns that there may be differences in size and he also learns what these differences, in the instant case at least, actually are.

The blocks are also, preferably, of different colors, or of different shades of one color, so that a child also learns that there are differences in color. The colors may be so arranged that what I call the "heaviest" color is used upon the largest block and the "lightest" color is used upon the smallest block.

When the colors are so arranged and correlated with the respective sizes of the blocks, the child soon learns to associate size with color or shade and vice versa, all to the end that beneficial results are thereby obtained. That is to say, if different shades of the color blue, for example, are used, a child will inevitably be instructed or educated if he can understand in his mind that a dark blue connotes a large size block and if he can appreciate that as the colors of the blocks grow progressively lighter in shade, the sizes of the blocks become progressively smaller in size.

As a third factor which is interposed here for a child's consideration, I provide weight means in each receptacle which are hidden from the child's view so as to mystify him and thereby to encourage him to play with the device. Differences in the weights of the respective receptacles may be accomplished by differences in the respective thicknesses of the walls of the same, although not necessarily so.

Additional weight means may be added so as to exaggerate the differences in the respective receptacles for obvious reasons.

The weight means are so arranged and correlated that the heaviest weight is placed in the largest receptacle and the lightest weight is placed in the smallest receptacle, with other respective weights, intermediate the heaviest and the lightest, being placed in their proper receptacles accordingly. By such means, the child is taught to correlate weight and size, weight and color and weight, size and color in combination, all of which are results very much to be desired.

My fourth factor is one which I call my "sound factor"; my other factors being appropriately named "size factor," "color factor," and "weight factor." I have selected such weight means as will give certain desired sounds when they are shaken within their containers. That is to say, in my largest receptacle, I have placed stones which when shaken provide a very deep sound and in my smallest receptacle I have placed seeds which when shaken give a very soft sound. Other sound means may be used so as to create the proper range of sounds and I have found such means as sifted sand, bird shot, lead weights, and the like to be very suitable.

By virtue of this fourth factor, a child learns to correlate sound with size, color and weight, each separately, and as he improves in combinations of twos (such as sound with size and color, sound with size and weight, and sound with color and weight) and in combination of all three (that is, sound with size, and color, and weight).

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. An educational device for children comprising in combination, a plurality of separate receptacles each having side walls and bottom walls, the said receptacles being of graduated sizes whereby they may be arranged in nested relation with the bottom wall of a smaller receptacle resting on the bottom wall of a next larger receptacle, the bottom walls of each receptacle including spaced wall members co-operating with the side walls of the receptacles to provide compartments in the lower side of said receptacles, and a group of separate objects in each of said compartments arranged with relation to said compartments whereby as each receptacle is shaken the objects in the compartment thereof strike against the walls forming said compartment to produce sounds.

2. An educational device for children comprising in combination, a plurality of separate receptacles each having side walls and bottom walls, the said receptacles being of graduated sizes whereby they may be arranged in nested relation with the bottom wall of a smaller receptacle resting on the bottom wall of a next larger receptacle, the bottom walls of each receptacle including spaced wall members co-operating with the side walls of the receptacles to provide compartments in the lower side of said receptacles, and a group of separate objects in each of said compartments arranged with relation to said compartments whereby as each receptacle is shaken the objects in the compartment theerof strike against the walls forming said compartment to produce sounds, the objects in the compartments being arranged and adapted so that those of a larger receptacle produce a deeper sound than those of a relatively smaller receptacle.

ANNE FARRELL HERLIHY.